US011934110B2

(12) United States Patent
Oura et al.

(10) Patent No.: US 11,934,110 B2
(45) Date of Patent: Mar. 19, 2024

(54) DEVELOPING ROLL

(71) Applicant: NOK CORPORATION, Tokyo (JP)

(72) Inventors: Kosuke Oura, Kanagawa (JP); Atsushi Ikeda, Kanagawa (JP); Satoshi Fukuoka, Kanagawa (JP); Kenji Sasaki, Kanagawa (JP)

(73) Assignee: NOK CORPORATION, Tokyo (JP)

( * ) Notice: Subject to any disclaimer, the term of this patent is extended or adjusted under 35 U.S.C. 154(b) by 0 days.

(21) Appl. No.: 17/927,443

(22) PCT Filed: Mar. 16, 2021

(86) PCT No.: PCT/JP2021/010621
§ 371 (c)(1),
(2) Date: Nov. 23, 2022

(87) PCT Pub. No.: WO2021/256028
PCT Pub. Date: Dec. 23, 2021

(65) Prior Publication Data

US 2023/0221661 A1 Jul. 13, 2023

(30) Foreign Application Priority Data

Jun. 18, 2020 (JP) ................................ 2020-105318

(51) Int. Cl.
*G03G 15/08* (2006.01)

(52) U.S. Cl.
CPC ..... *G03G 15/0808* (2013.01); *G03G 15/0818* (2013.01)

(58) Field of Classification Search
CPC ...................... G03G 15/0808; G03G 15/0818
(Continued)

(56) References Cited

U.S. PATENT DOCUMENTS

2020/0125003 A1 4/2020 Ikeda et al.

FOREIGN PATENT DOCUMENTS

EP 3 088 962 11/2016
EP 3 130 963 2/2017
(Continued)

OTHER PUBLICATIONS

International Search Report issued in IInternational Patent Application No. PCT/JP2021/010621, dated May 18, 2021, along with an English translation thereof.
(Continued)

*Primary Examiner* — Hoan H Tran
(74) *Attorney, Agent, or Firm* — GREENBLUM & BERNSTEIN, P.L.C.

(57) ABSTRACT

A developing roll has a metal core, an elastic layer, and a surface layer. A value X is 65.6 N/mm$^3$ or more and a value Y is 229 μm or more. The value X is $P_1/(D_1 \times A)-P_2/(D_2 \times A)$. $P_1$ is the load to displace the roll 100 μm when a metal probe is pressed against the roll. $D_1$ is the displacement of the roll caused by the probe under the load $P_1$. A is the area of the probe. $P_2$ is the load to displace a material roll by 100 μm when the probe presses against the material roll with the core and the elastic layer and without the surface layer. $D_2$ is the displacement of the material roll caused by the probe under the load $P_2$. The value Y is the displacement of the roll when the probe pierces the surface layer.

4 Claims, 5 Drawing Sheets

(58) Field of Classification Search
USPC .......................................................... 399/286
See application file for complete search history.

(56) References Cited

FOREIGN PATENT DOCUMENTS

| | | | |
|---|---|---|---|
| JP | 2002-372855 | | 12/2002 |
| JP | 2004317731 | * | 11/2004 |
| JP | 2005172941 | * | 6/2005 |
| JP | 2006-276714 | | 10/2006 |
| JP | 2018-5017 | | 1/2018 |

OTHER PUBLICATIONS

Extended European Search Report issued in EP Application No. 21825200.5, dated Oct. 18, 2023.
Japan Office Action issued in JP Application No. 2022-532301, dated Jan. 9, 2024.

* cited by examiner

FIG. 10

| | X (N/mm$^3$) | Y (μm) | Z (N/mm$^2$) | ABRASION MARK AFTER PRINTING 6000 SHEETS | PEELING OF SURFACE LAYER AFTER PRINTING 6000 SHEETS |
|---|---|---|---|---|---|
| SAMPLE 1 | 65.6 | 890 | 6.56 | NONE | NONE |
| SAMPLE 2 | 70.6 | 350 | 7.06 | NONE | NONE |
| SAMPLE 3 | 82.6 | 340 | 8.26 | NONE | NONE |
| SAMPLE 4 | 95.5 | 785 | 9.55 | NONE | NONE |
| SAMPLE 5 | 109.5 | 559 | 10.95 | NONE | NONE |
| SAMPLE 6 | 116.2 | 437 | 11.62 | NONE | NONE |
| SAMPLE 7 | 120.0 | 593 | 12.00 | NONE | NONE |
| SAMPLE 8 | 127.9 | 785 | 12.79 | NONE | NONE |
| SAMPLE 9 | 163.5 | 463 | 16.35 | NONE | NONE |
| SAMPLE 10 | 189.5 | 259 | 18.95 | NONE | NONE |
| SAMPLE 11 | 201.6 | 229 | 20.16 | NONE | NONE |
| SAMPLE 12 | 215.5 | 248 | 21.55 | NONE | NONE |
| SAMPLE 13 | 38.3 | 780 | 3.83 | OCCURRED | NONE |
| SAMPLE 14 | 55.0 | 815 | 5.50 | OCCURRED | NONE |
| SAMPLE 15 | 65.3 | 750 | 6.53 | OCCURRED | NONE |
| SAMPLE 16 | 146.7 | 210 | 14.67 | NONE | OCCURRED |
| SAMPLE 17 | 121.8 | 180 | 12.18 | NONE | OCCURRED |
| SAMPLE 18 | 150.8 | 180 | 15.08 | NONE | OCCURRED |
| SAMPLE 19 | 191.5 | 95 | 19.15 | NONE | OCCURRED |
| SAMPLE 20 | 80.6 | 380 | 8.06 | NONE | NONE |

DEVELOPING ROLL

TECHNICAL FIELD

The present invention relates to developing rolls used in electrophotographic image forming apparatuses.

BACKGROUND ART

In an electrophotographic image forming apparatus, a developing device is provided to supply a developing agent, i.e., toner, to a photoconductor drum. The developing device has a toner container and a developing roll. Toner that adheres to the outer peripheral surface of the developing roll is supplied to the photoconductor drum as the developing roll rotates. An electrostatic latent image is formed on the photoconductor drum, and toner particles are transferred from the developing roll to the electrostatic latent image to produce a toner developed image (Patent Document 1).

The developing device further has a member called a regulation blade or doctor blade. The doctor blade regulates the amount of toner particles that adhere to the developing roll and are transferred from the toner container. The doctor blade is brought into contact with the developing roll with a certain level of force.

BACKGROUND DOCUMENT(S)

Patent Document(s)

Patent Document 1: JP-A-2002-372855

SUMMARY OF THE INVENTION

The developing roll is brought into contact with the photoconductor drum with a certain level of force and is also subjected to force from the doctor blade as described above. There is a demand to increase the durability of the developing roll used in an environment in which it is subjected to such forces.

Accordingly, the present invention provides a highly durable developing roll.

In accordance with an aspect of the present invention, there is provided a developing roll used in an electrophotographic image forming apparatus. The developing roll includes a core member made of a metal, an elastic layer made of a rubber disposed around the core member, and a surface layer disposed around the elastic layer. In the developing roll, a value X is equal to or greater than 65.6 N/mm$^3$ and a value Y is equal to or greater than 229 μm, in which the value X is calculated from the following equation:

$$X=P_1/(D_1\times A)-P_2/(D_2\times A).$$

$P_1$ is a load required to displace the developing roll by a depth of 100 μm in a radial direction when a truncated cone-shaped metal probe having a distal end of which a diameter is 40 μm is pressed against the developing roll. $D_1$ is a displacement of the developing roll caused by the probe under the load $P_1$. A is an area of the distal end of the probe. $P_2$ is a load required to displace a material roll by a depth of 100 μm in a radial direction when the probe is pressed against the material roll that includes the core member and the elastic layer and does not include the surface layer. $D_2$ is a displacement of the material roll caused by the probe under the load $P_2$. The value Y is a displacement of the developing roll caused by the probe when the probe, which is pressed against the developing roll and is displaced in a radial direction of the developing roll, pierces the surface layer.

The value X is a kind of index of the compressive strength of the surface layer. In this aspect, the value X is equal to or greater than 65.6 N/mm$^3$, so that wear (abrasion) of the surface layer is small. The value Y is an index of the compressive toughness of the surface layer. In this aspect, the value Y is equal to or greater than 229 μm, so that the surface layer is less likely to peel off from the elastic layer. Therefore, if the value X is equal to or greater than 65.6 N/mm$^3$ and the value Y is equal to or greater than 229 μm, the developing roll has high durability to achieve a long life span.

In accordance with an aspect of the present invention, there is provided a developing roll used in an electrophotographic image forming apparatus. The developing roll includes a core member made of a metal, an elastic layer made of a rubber disposed around the core member, and a surface layer disposed around the elastic layer. In the developing roll, a value Z is equal to or greater than 6.56 N/mm$^2$ and a value Y is equal to or greater than 229 μm, in which the value X is calculated from the following equation:

$$Z=(P_1-P_2)/A.$$

$P_1$ is a load required to displace the developing roll by a depth of 100 μm in a radial direction when a truncated cone-shaped metal probe having a distal end of which a diameter is 40 μm is pressed against the developing roll. $P_2$ is a load required to displace a material roll by a depth of 100 μm in a radial direction when the probe is pressed against the material roll that includes the core member and the elastic layer and does not include the surface layer. A is an area of the distal end of the probe. The value Y is a displacement of the developing roll caused by the probe when the probe, which is pressed against the developing roll and is displaced in a radial direction of the developing roll, pierces the surface layer.

The value Z is a kind of index of the compressive strength of the surface layer. In this aspect, the value Z is equal to or greater than 6.56 N/mm$^2$, so that abrasion of the surface layer is small. The value Y is an index of the compressive toughness of the surface layer. In this aspect, the value Y is equal to or greater than 229 μm, so that the surface layer is less likely to peel off from the elastic layer. Therefore, if the value Z is equal to or greater than 6.56 N/mm$^2$ and the value Y is equal to or greater than 229 jam, the developing roll has high durability to achieve a long life span.

BRIEF DESCRIPTION OF THE DRAWINGS

FIG. 10 is a table showing measurement results of indices of the surface layer of multiple samples of the developing roll and the results of the durability test of the samples.

DESCRIPTION OF EMBODIMENT

Hereinafter, with reference to the accompanying drawings, an embodiment according to the present invention will be described. It is of note that the drawings are not necessarily to scale, and certain features may be exaggerated or omitted.

Figure 1:
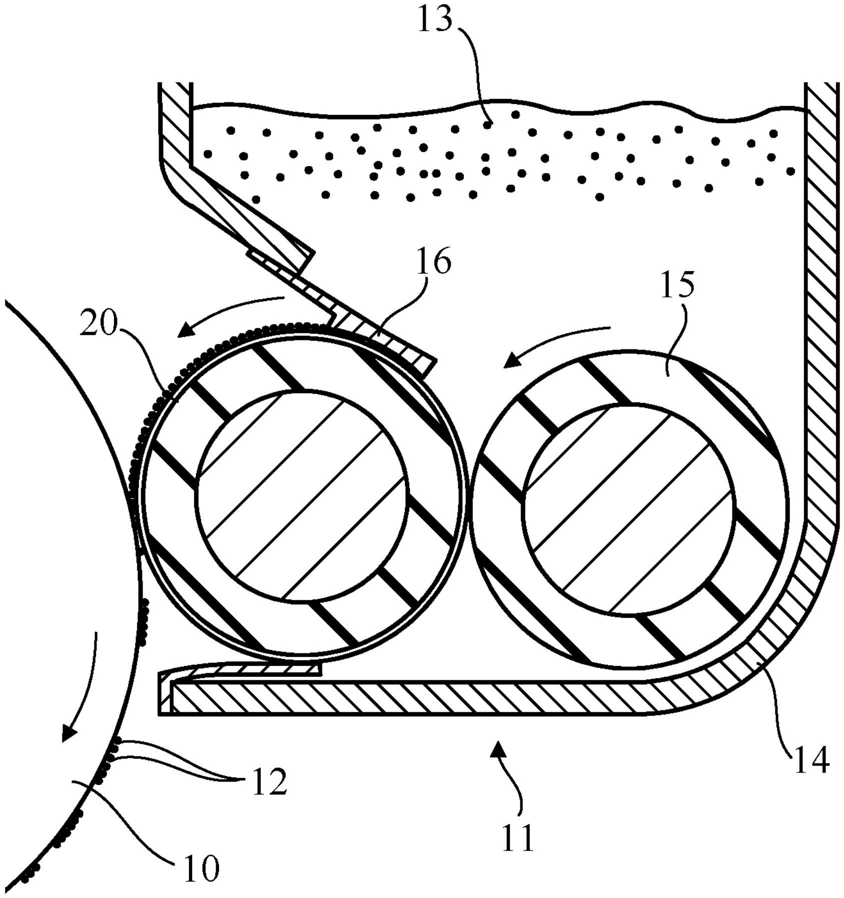
FIG. 1 shows a state of use of the developing roll in accordance with an embodiment of the present invention.

As shown in FIG. 1, an electrophotographic image forming apparatus has a photoconductor drum 10 and a developing unit 11. The photoconductor drum 10 rotates in the direction depicted by the arrow. The developer device 11 supplies toner particles 12, which are a developing agent, to the photoconductor drum 10. An electrostatic latent image is formed on the surface of the photoconductor drum 10 by a latent image forming device (not shown), and the toner particles 12 are transferred to the electrostatic latent image from the developing device 11, so that toner developed image with the toner particles 12 is generated on the outer peripheral surface of the photoconductor drum 10.

The developing device 11 has a toner container 14 that stores a mass 13 of toner particles, an elastic roll 15 disposed entirely within the toner container 14, a developing roll 20 disposed partially within the toner container 14, and a doctor blade 16 (regulation blade) supported by the toner container 14. The elastic roll 15 is pressed against the developing roll 20, and the developing roll 20 is pressed against the photoconductor drum 10. The elastic roll 15 and the developing roll 20 are rotated in directions indicated by the arrows, respectively, so that an almost constant amount of toner particles in the toner container 14 adhere to the developing roll 20. Thus, a thin layer of the toner particles is formed on the outer peripheral surface of the developing roll 20. As the developing roll 20 rotates, the toner particles that adhere to the developing roll 20 are transported toward the photoconductor drum 10. The doctor blade 16 positioned at the outlet for the toner particles in the toner container 14 is pressed against the outer peripheral surface of the developing roll 20 to regulate the amount of toner particles that adhere to the roll 20 and are conveyed from the toner container 14. Thus, the developing roll 20 is brought into contact with each of the photoconductor drum 10, the elastic roll 15, and the doctor blade 16 with a certain degree of force.

Although not shown, the developing device 11 may be provided with a member that agitates the mass 13 of toner particles in the toner container 14, a screw for conveying the toner particles in the toner container 14, etc.

Figure 2:
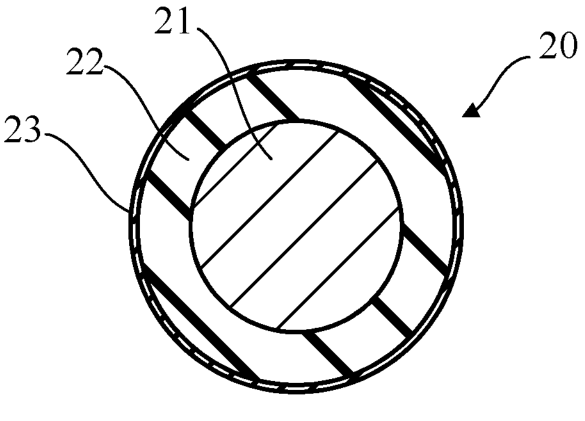
FIG. 2 is a cross-sectional view of the developing roll according to the embodiment.

As shown in FIG. 2, the developing roll 20 includes a cylindrical core member 21 made of a metal, a core member 21 that is made of a rubber, is disposed around the core member 21, and has a uniform thickness, and a surface layer 23 that is made of a rubber, is disposed around the elastic layer 22, and has a uniform thickness. The diameter of the core member 21 is several millimeters, the thickness of the elastic layer 22 is 1 to 3 mm, and the thickness of the surface layer 23 is several micrometers to several tens of micrometers.

Both the elastic layer 22 and the surface layer 23 are made of rubber. In the embodiment, both the elastic layer 22 and the surface layer 23 are made of silicone rubber. However, the elastic layer 22 is provided to ensure the elasticity of the developing roll 20, and the surface layer 23 is provided to improve the abrasion resistance of the surface of the developing roll 20. Therefore, components of the material of the surface layer 23 are different from components of the material of the elastic layer 22.

In the embodiment, the surface layer 23 was produced as follows:

First, the following materials were mixed in a first step.

Urethane modified hexamethylene diisocyanate with solid contents of 80 weight percent (grade "E402-80B" of "DURANATE" (trade name) manufactured by Asahi Kasei Corporation (Tokyo, Japan)): 16.5 weight percent.

Reactive silicone oil ("X-22-160AS" (trade name) manufactured by Shin-Etsu Chemical Co. (Tokyo, Japan)): 36.7 weight percent.

Butyl acetate as a diluting solvent: 46.8 weight percent.

The mixture was then left at 120 degrees Celsius for three hours to promote the reaction of the components, thereby producing a prepolymer.

Next, the following materials were mixed in a second step.

The prepolymer produced in the first step.

Isocyanate with solid contents of 75 weight percent ("Desmodur L75" (trade name) manufactured by Sumika Covestro Urethane Co, Ltd. (Hyogo, Japan)) as a binder.

Carbon dispersed liquid with solid contents of 20 to 30 weight percent ("MHI-BK" (trade name) manufactured by Mikuni Color Ltd. (Hyogo, Japan).

Butyl acetate as a diluting solvent: 44.7 weight percent.

Furthermore, in a third step, 2.6 weight percent of silicone rubber particles were added to the mixture obtained in the second step to produce a coating solution. The silicone rubber particles were "EP-2720" (trade name) manufactured by DuPont Toray Specialty Materials K.K. (Tokyo, Japan). The hardness of the silicone rubber particles measured with a durometer (Type A according to "JIS K 6253" and "ISO 7619") was 70 degrees. The average particle diameter of the silicone rubber particles was 2 μm.

In a fourth step, the outer periphery of the elastic layer 22 was coated with the coating solution, and the coating solution was cured, whereby the surface layer 23 was produced.

The applicant adjusted the composition of the material of the surface layer 23 and produced multiple samples with different properties in the surface layer 23. Specifically, the applicant changed the proportions of the prepolymer, isocyanate, and the carbon dispersed liquid in the second step.

In each sample, the diameter of the core member 21 was 6 mm, the thickness of the elastic layer 22 was 1.5 mm, and the thickness of the surface layer 23 was 10±2 μm. However, in one sample (sample 20 in FIG. 11), the thickness of the surface layer 23 was 20 μm.

The applicant measured indices X and Y indicating the durability of the surface layer 23 of each samples. The applicant also actually mounted the samples on a printer and tested the durability of the samples.

Figure 3:
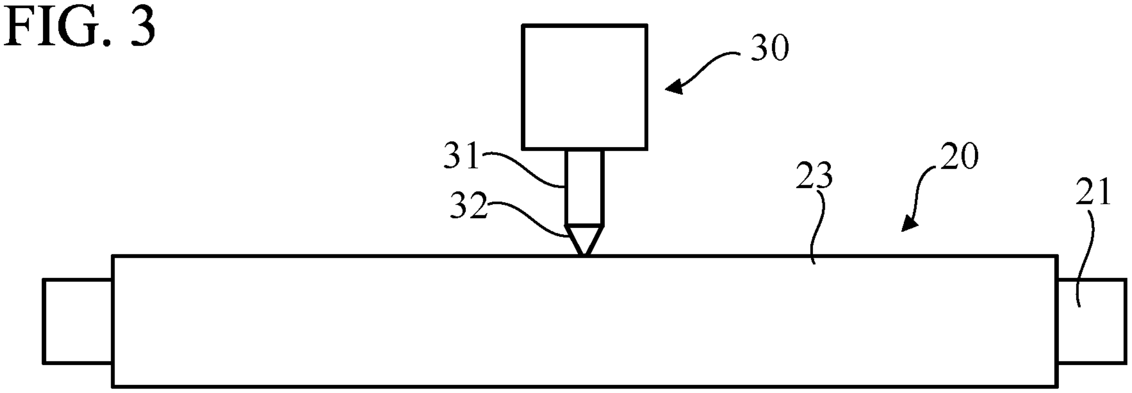
FIG. 3 is a front view of the developing roll under a compression test.
Figure 4:
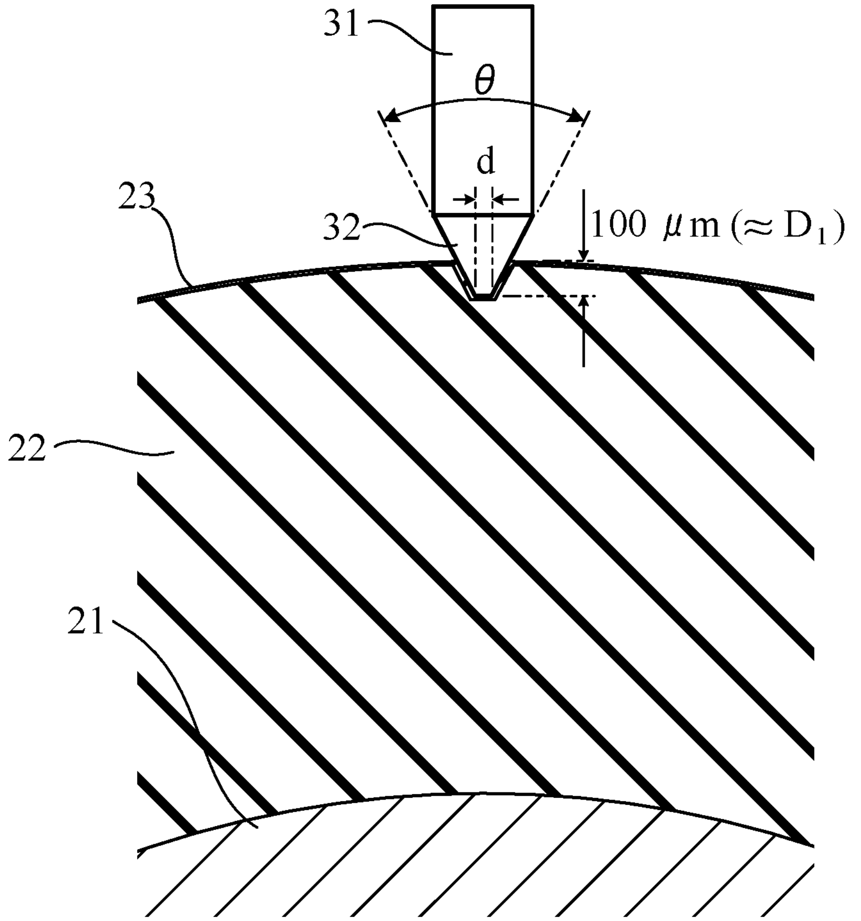
FIG. 4 is an enlarged cross-sectional view of the developing roll under the compression test.
Figure 5:
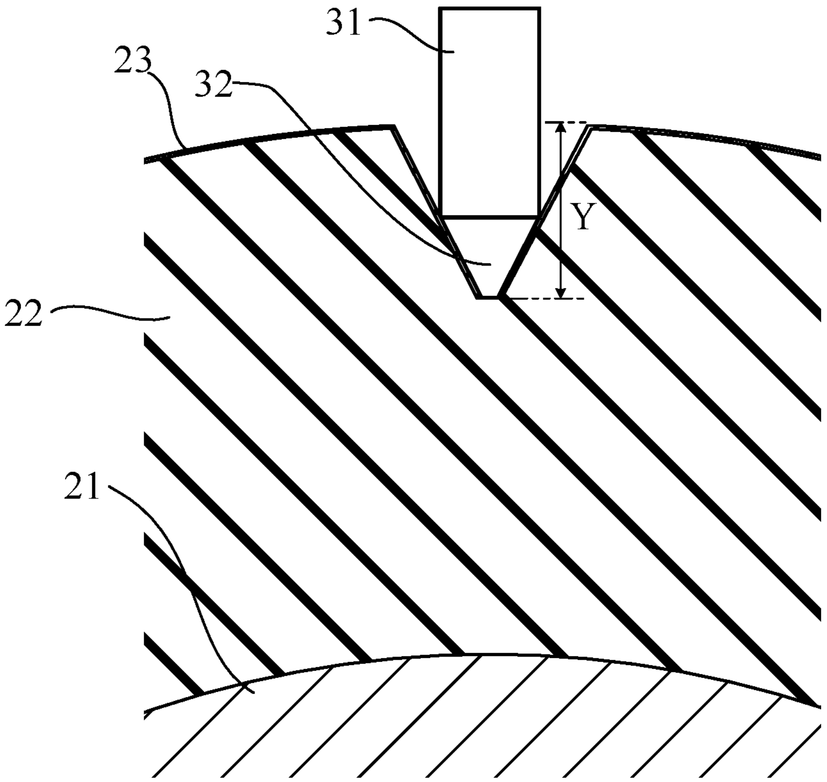
FIG. 5 is another enlarged cross-sectional view of the developing roll under the compression test.

FIGS. 3 to 5 show a compression test to measure the indices indicating the durability of the surface layer 23 of each samples. For the compression test, a compression tester 30 was used. The compression tester 30 has a cylindrical movable shaft 31 and a probe 3 formed on the distal end of the movable shaft 31. The movable shaft 31 and probe 32 are made of a metal. The compression tester 30 can measure the displacement of the probe 32 and the load given to the probe 32 while automatically pushing down the movable shaft 31.

The compression tester 30 used was "LNP nano touch" manufactured by Ludwig Nano Präzision GmbH (Nordheim, Germany). The probe 32 is truncated conical in shape with a diameter that decreases away from the movable shaft 31, and the diameter of the distal end of the probe 32 was 40 μm. The apex angle θ of the truncated cone was 30 degrees.

As shown in FIG. 3, the distal end of the probe 32 was brought into contact with the longitudinal center of the developing roll 20, and the movable shaft 31 was driven to push the probe 32 in a normal direction of the outer peripheral surface (radial direction) of the developing roll 20. The pushing speed was about 50 μm/s and was almost constant since the V-control mode was selected in "LNP nano touch". The maximum depth of pushing was set slightly less than 1.5 mm, which was the thickness of the elastic layer 22.

During the pushing process, the displacement of the probe 32 and the load applied to probe 32 were recorded. In "LNP nano touch", the resolution of displacement (increments of displacement reading) is 10 nm From the recording results, values $X_1$, Y, and $Z_1$ were obtained.

The values $X_1$ and $Z_1$ were calculated from the following equations:

$$X_1=P^1/(D_1\times A),$$

$$Z_1=P^1/A.$$

Here, $P_1$ was the load required to displace the developing roll 20 by a depth of 100 μm in the radial direction when the truncated cone-shaped metal probe 23 having a distal end of which the diameter d is 40 μm was pressed against the developing roll 20. In other words, $P_1$ is the load applied to the probe 32 in the state shown in FIG. 4. $D_1$ was the displacement of the developing roll 20 caused by the probe 32 under the load $P_1$. In short, $D_1$ is the displacement of the probe 32 in the state shown in FIG. 4, and is about 100 μm, but in the pushing process, $D_1$ was the recorded reading of the displacement of the probe 32 when the recorded reading of the displacement of the probe 32 exceeded 100 μm for the first time. More exactly, $P_1$ was also the load at which the recorded reading of the displacement of the probe 32 exceeded 100 μm for the first time during the pushing process.

The value A is the area of the distal end of the probe 32 and is calculated from the following equation:

$$A=\pi\times(d/2)^2.$$

Figure 6:
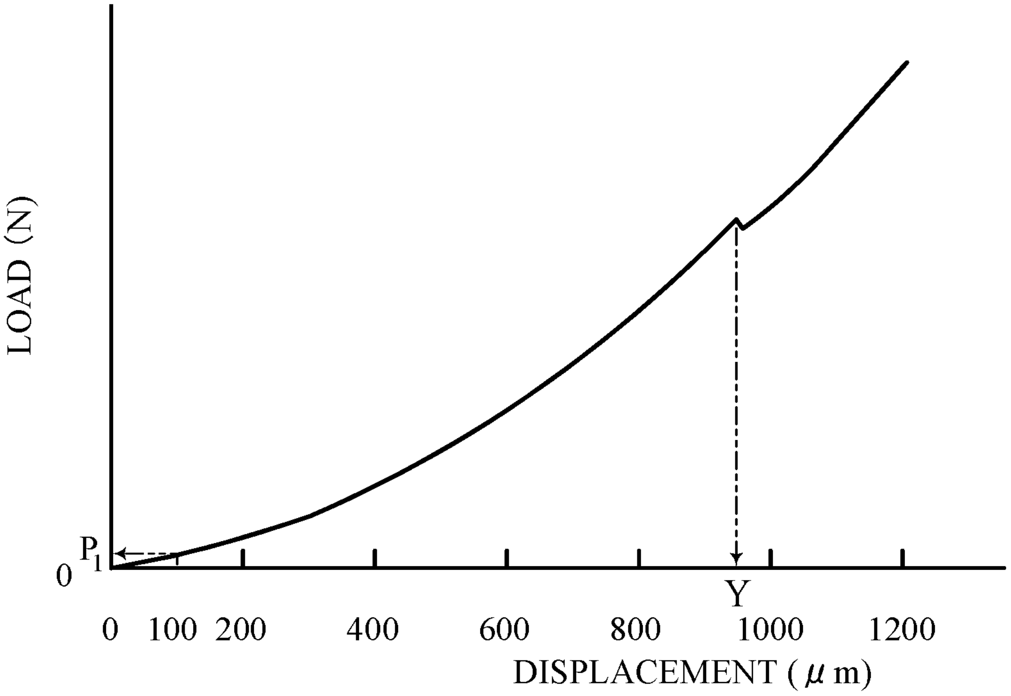
FIG. 6 is a load-displacement diagram obtained from the compression test.

The value Y was the displacement of the developing roll 20 caused by the probe 32 when the probe 32, which was pressed against the developing roll 20 and was displaced in the radial direction of the developing roll 20, pierced (penetrated) the surface layer 23 as shown in FIG. 5. FIG. 6 is a load-displacement diagram obtained from the compression test. The value Y is the amount of displacement when a sudden drop in load occurs, as shown in FIG. 6. The value Y was obtained from the compression test, but corresponds to the breaking elongation in terms of tensile tests. However, the value Y is the amount of deformation, expressed in μm, whereas the breaking elongation is a strain obtained by dividing the amount of deformation by the original total length, and thus, the breaking elongation is a dimensionless quantity. The value Y is an index of the compressive toughness of the surface layer 23.

On the other hand, the value $X_1$ can be considered to be an index of the compressive strength (in short, hardness) of the developing roll 20. However, $X_1$ is influenced by not only the hardness of the surface layer 23, but also the hardness of the elastic layer 22. Accordingly, a material roll (not shown) that has the core member 21 and the elastic layer 22 and does not have the surface layer 23 was prepared, and a value $X_2$ and a value $Z_2$ were calculated for the material roll from the following equations:

$$X_2=P_2/(D_2\times A),$$

$$Z_2=P_2/A.$$

Here, $P_2$ was the load required to displace the material roll 20 by a depth of 100 μm in the radial direction when the probe 32 was pressed against the material roll. $D_2$ was the displacement of the material roll caused by the probe under the load $P_2$. $D_2$ is about 100 μm, but in the pushing process, $D_2$ was the recorded reading of the displacement of the probe 32 when the recorded reading of the displacement of the probe 32 exceeded 100 μm for the first time. More exactly, $P_2$ was also the load at which the recorded reading of the displacement of the probe 32 exceeded 100 μm for the first time during the pushing process.

Then, values X and Z in which the effect of the hardness of the elastic layer 22 are canceled out were calculated from the following equations:

$$X=X_1-X_2,$$

$$Z=Z_1-Z_2.$$

Therefore, the values X and Z can be calculated from the following equations:

$$X=P_1/(D_1\times A)-P_2/(D_2\times A)$$

$$Z=(P_1-P_2)/A$$

The values X and Z can be considered to be indices of the compressive strength (in short, hardness) of the surface layer 23. Specifically, the value X is approximately equal to the difference between the force required to displace the developing roll 20 by 100 μm in a radial direction by the probe 32 and the force required to displace the material roll by 100 μm in a radial direction by the probe 32 divided by the volume of the probe 32 impaling the roll. The value Z is equal to the above difference between the forces divided by the area of the distal end of the probe 32.

In the durability test, each sample was mounted on a color printer "HL-L8360CDW" (trade name) manufactured by Brother Industries, Ltd. (Aichi, Japan). The printer was then used to print, and after printing on 6000 sheets of A4 paper with the use of each sample, it was determined, with human eyes, whether or not the surface layer 23 had one or more abrasion marks and whether or not one or more peelings of the surface layer 23 occurred. In the printing, a uniform image of 1% density was formed over the entire surface of each sheet.

Figure 7:
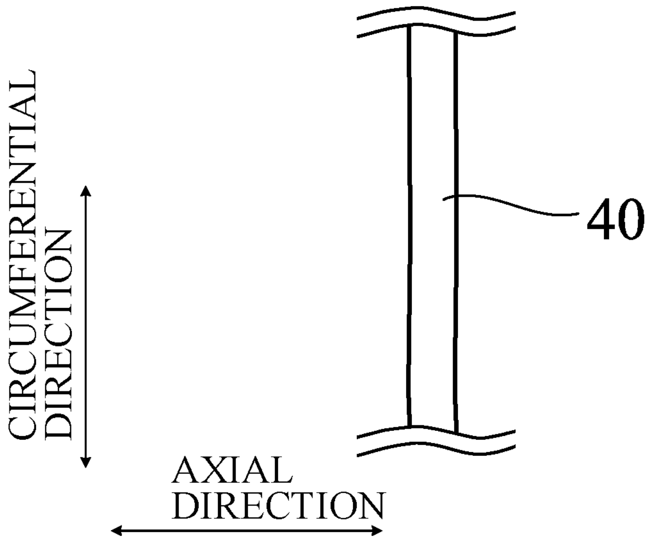
FIG. 7 is a plan view of the developing roll showing an abrasion mark that may occur on the surface of the developing roll.

Excessive wear (abrasion) of the surface layer 23 appears as a linear abrasion mark (wear mark) 40 on the surface layer 23 as shown in the plan view of the developing roll 20 in FIG. 7. The abrasion mark 40 extend along the circumferential direction of the developing roll 20. This is because a portion of the doctor blade 16, which is in contact with the outer peripheral surface of the rotating developing roll 20, wears (abrades) the surface layer 23.

Figure 8:
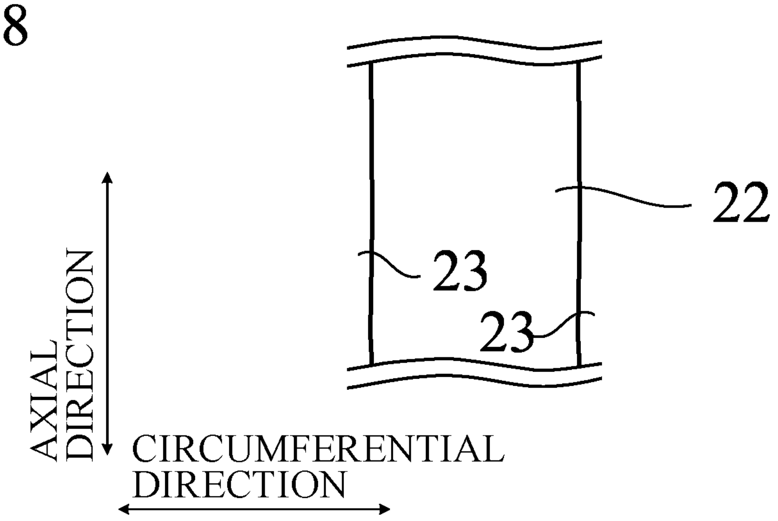
FIG. 8 is a plan view of the developing roll showing a peeling of the surface layer of the developing roll.
Figure 9:
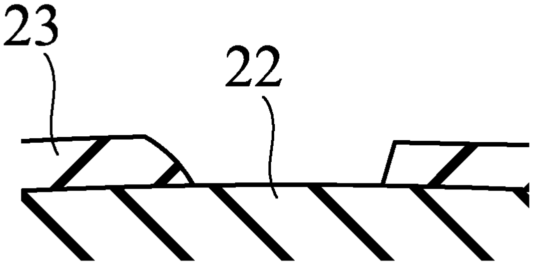
FIG. 9 is a cross-sectional view of a developing roll showing the peeling of the surface layer of the developing roll.

Peeling of the surface layer 23 results in exposure of the elastic layer 22, as shown in FIG. 8 (plan view) and FIG. 9 (cross-sectional view).

FIG. 10 shows the values X, Y, and Z of the samples and the results of the durability test of the samples. In samples 1-12 and 20, neither abrasion mark nor peeling occurred on the surface layer 23. In samples 13-19, one or more abrasion marks or one or more peelings occurred on the surface layer 23.

The results shown in FIG. 10 indicate that it is preferable that the value X be equal to or greater than 65.6 N/mm$^3$, and that the value Y be equal to or greater than 229 μm. In addition, it will be understood that it is preferable that the value Z be equal to or greater than 6.56 N/mm$^2$, and that the value Y be equal to or greater than 229 μm. The values X and Z are kinds of indices of the compressive strength of the surface layer 23. By having a value X equal to or greater than 65.6 N/mm$^3$, the surface layer 23 has less abrasion. By having a value Z equal to or greater than 6.56 N/mm$^2$, the surface layer 23 has less abrasion. In samples 13 to 15, in which the values X and Z are smaller, one or more abrasion marks occurred on the surface layer 23.

The value Y is an index of the compressive toughness of the surface layer 23. By having a value Y equal to or greater than 229 μm, the surface layer 23 is less likely to peel off from the elastic layer 22. In samples 16-19, in which the value Y is smaller, peeling of the surface layer 23 occurred.

Thus, if the value X is equal to or greater than 65.6 N/mm$^3$ and the value Y is equal to or greater than 229 μm, the developing roll 20 is highly durable to achieve a long life span. Similarly, if the value Z is equal to or greater than 6.56 N/mm$^2$ and the value Y is equal to or greater than 229 μm, the developing roll 20 has high durability to achieve a long life span.

Although preferred upper limits of the values X, Y, and Z are unknown, neither abrasion marks nor peelings occurred on the surface layer 23 of sample 12, of which the value X is 215.5 N/mm$^3$ and the value Z is 21.55 N/mm$^2$, and neither abrasion marks nor peelings occurred on the surface layer 23 of sample 1, of which the value Y is 890 μm. Accordingly, a preferred range for the value X includes at least the range from 65.6 N/mm$^3$ to 215.5 N/mm$^3$, and a preferred range for the value Y includes at least the range from 229 μm to 890 μm. A preferred range for the value Z includes at least the range from 6.56 N/mm$^2$ to 21.55 N/mm$^2$.

The thickness of the surface layer 23 of sample 20 is 20 μm, which is greater than the thickness of the surface layer 23 of the other samples. The material composition of the surface layer 23 of sample 20 is the same as that of the surface layer 23 of sample 2. The sole difference between samples 2 and 20 is the thickness of the surface layer 23. Samples 2 and 20 showed almost the same results. Therefore, even though the thickness of the surface layer 23 varies, it is considered that it is preferable that the value X be equal to or greater than 65.6 N/mm$^3$ and the value Y be equal to or greater than 229 μm. Similarly, it is considered that it is preferable that the value Z be equal to or greater than 6.56 N/mm$^2$, and that the value Y be equal to or greater than 229 μm.

The present invention has been shown and described with reference to preferred embodiments thereof. However, it will be understood by those skilled in the art that various changes in form and detail may be made without departing from the scope of the invention as defined by the claims. Such variations, alterations, and modifications are intended to be encompassed in the scope of the present invention.

REFERENCE SYMBOLS

20: Developing roll
21: Core member
22: Elastic layer
23: Surface layer

The invention claimed is:

1. A developing roll used in an electrophotographic image forming apparatus, the developing roll comprising:

a core member made of a metal;

an elastic layer made of a rubber disposed around the core member; and a surface layer disposed around the elastic layer, wherein a value X defines an index of a compressive strength of the surface layer and is equal to or greater than 65.6 N/mm$^3$, and a value Y is equal to or greater than 229 μm, wherein the value X is calculated from the following equation:

$$X=P_1/(D_1\times A)-P_2/(D_2\times A),$$

where $P_1$ is a load required to displace the developing roll by a depth of 100 μm in a radial direction when a truncated cone-shaped metal probe having a distal end of which a diameter is 40 μm is pressed against the developing roll, $D_1$ is a displacement of the developing roll caused by the probe under the load $P_1$, A is an area of the distal end of the probe, $P_2$ is a load required to displace a material roll by a depth of 100 μm in a radial direction when the probe is pressed against the material roll that includes the core member and the elastic layer and does not include the surface layer, $D_2$ is a displacement of the material roll caused by the probe under the load $P_2$, the value Y is a displacement of the developing roll caused by the probe when the probe, which is pressed against the developing roll and is displaced in a radial direction of the developing roll, pierces the surface layer.

2. The developing roll according to claim 1, wherein the value X is equal to or less than 215.5 N/mm$^3$, and wherein the value Y is equal to or less than 890 μm.

3. A developing roll used in an electrophotographic image forming apparatus, the developing roll comprising:

a core member made of a metal;

an elastic layer made of a rubber disposed around the core member; and a surface layer disposed around the elastic layer, wherein a value Z defines an index of a compressive strength of the surface layer and is equal to or greater than 6.56 N/mm$^2$, and a value Y is equal to or greater than 229 μm, wherein the value Z is calculated from the following equation:

$$Z=(P_1-P_2)/A,$$

where $P_1$ is a load required to displace the developing roll by a depth of 100 μm in a radial direction when a truncated cone-shaped metal probe having a distal end of which a diameter is 40 μm is pressed against the developing roll, $P_2$ is a load required to displace a material roll by a depth of 100 μm in a radial direction when the probe is pressed against the material roll that includes the core member and the elastic layer and does not include the surface layer, A is an area of the distal end of the probe, the value Y is a displacement of the developing roll caused by the probe when the probe, which is pressed against the developing roll and is displaced in a radial direction of the developing roll, pierces the surface layer.

4. The developing roll according to claim 3, wherein the value Z is equal to or less than 21.55 N/mm$^2$, and wherein the value Y is equal to less than 890 μm.

* * * * *